(12) United States Patent
Arrowood et al.

(10) Patent No.: US 8,311,828 B2
(45) Date of Patent: Nov. 13, 2012

(54) KEYWORD SPOTTING USING A PHONEME-SEQUENCE INDEX

(75) Inventors: Jon A. Arrowood, Smyrna, GA (US); Robert W. Morris, Atlanta, GA (US); Mark Finlay, Tucker, GA (US); Scott A. Judy, Newnan, GA (US)

(73) Assignee: Nexidia Inc., Atlanta, GA (US)

( * ) Notice: Subject to any disclaimer, the term of this patent is extended or adjusted under 35 U.S.C. 154(b) by 1083 days.

(21) Appl. No.: 12/199,123

(22) Filed: Aug. 27, 2008

(65) Prior Publication Data

US 2009/0063151 A1 Mar. 5, 2009

Related U.S. Application Data

(60) Provisional application No. 60/968,333, filed on Aug. 28, 2007.

(51) Int. Cl.
 *G10L 15/04* (2006.01)

(52) U.S. Cl. ......... 704/254; 704/243; 704/251; 704/231

(58) Field of Classification Search .................. 704/254
 See application file for complete search history.

(56) References Cited

U.S. PATENT DOCUMENTS

| | | | |
|---|---|---|---|
| 6,073,095 A | 6/2000 | Dharanipragada et al. | |
| 6,985,861 B2 * | 1/2006 | Van Thong et al. | 704/254 |
| 7,089,188 B2 * | 8/2006 | Logan et al. | 704/270 |
| 7,249,013 B2 * | 7/2007 | Al-Onaizan et al. | 704/9 |
| 7,263,484 B1 * | 8/2007 | Cardillo et al. | 704/236 |
| 7,313,521 B1 * | 12/2007 | Cardillo et al. | 704/236 |
| 7,324,939 B1 * | 1/2008 | Cardillo et al. | 704/236 |
| 7,406,415 B1 * | 7/2008 | Cardillo et al. | 704/236 |
| 7,475,065 B1 * | 1/2009 | Cardillo et al. | 1/1 |
| 7,599,475 B2 * | 10/2009 | Eilam et al. | 379/88.09 |
| 7,725,318 B2 * | 5/2010 | Gavalda et al. | 704/251 |
| 7,904,296 B2 * | 3/2011 | Morris | 704/254 |
| 7,979,266 B2 * | 7/2011 | Alpha | 704/8 |
| 2002/0138265 A1 * | 9/2002 | Stevens et al. | 704/251 |
| 2003/0004721 A1 * | 1/2003 | Zhou | 704/251 |
| 2003/0009324 A1 * | 1/2003 | Alpha | 704/9 |
| 2003/0088397 A1 * | 5/2003 | Karas et al. | 704/1 |
| 2003/0110035 A1 * | 6/2003 | Thong et al. | 704/254 |
| 2003/0187649 A1 * | 10/2003 | Logan et al. | 704/260 |
| 2005/0010412 A1 * | 1/2005 | Aronowitz | 704/254 |
| 2006/0074898 A1 * | 4/2006 | Gavalda et al. | 707/4 |
| 2006/0206324 A1 * | 9/2006 | Skilling et al. | 704/231 |
| 2006/0217966 A1 * | 9/2006 | Hu et al. | 704/200 |

(Continued)

OTHER PUBLICATIONS

Foote JT, Jones GJF, Sp"arck Jones K, Young SJ (1997) Unconstrained keyword spotting using phone lattices. Comput Speech Lang (in press).*

(Continued)

*Primary Examiner* — Greg Borsetti
(74) *Attorney, Agent, or Firm* — Occhiuti Rohlicek & Tsao LLP

(57) ABSTRACT

In some aspects, a wordspotter is used to locate occurrences in an audio corpus of each of a set of predetermined subword units, which may be phoneme sequences. To locate a query (e.g., a keyword or phrase) in the audio corpus, constituent subword units in the query are indentified and then locations of those subwords are determined based on the locations of those subword units determined earlier by the wordspotter, for example, using a pre-built inverted index that maps subword units to their locations.

4 Claims, 3 Drawing Sheets

U.S. PATENT DOCUMENTS

2007/0033003 A1 2/2007 Morris
2008/0033986 A1* 2/2008 McCusker et al. ............ 707/102
2008/0270138 A1* 10/2008 Knight et al. ................ 704/260

OTHER PUBLICATIONS

Chen, H.H. (2003). Spoken Cross-Language Access to Image Collection via Captions. In Proceedings of Eurospeech 2003.*
P. Jourlin, S. E. Johnson, K. Sp\ärck Jones, and P. C. Woodland, "General query expansion techniques for spoken document retrieval," presented at the Proc. SIGIR'99, Aug. 1999.*
Cardillo et al., 2002 P. Cardillo, M. Clements and M. Miller, Phonetic searching vs. LVCSR: how to find what you really want in audio archives, Internat. J. Speech Technol. 5 (2002), pp. 9-22.*
G. J. F. Jones, J. T. Foote, K. Sparck Jones, and S. J. Young. Retrieving spoken documents by combining multiple index sources. In Proceedings of ACM SIGIR'96, pp. 30-38, 1996.*
Jones, G.J.F., Beyond English Text: Multilingual and Multimedia Information Retrieval, in Charting a New Course: Natural Language Processing and Information Retrieval. Essays in Honour of Karen Sparck Jones (ed. J. Tait), 2005, Kluwer. 2005.*
Federico and Jones, 2004 Federico, M., & Jones, G. (2004). The CLEF 2003 cross-language spoken document retrieval track. In C. Peters, M. Braschler, J. Gonzalo, & M. Kluck (Eds.), Proceedings of fourth workshop of the cross-language evaluation forum, CLEF 2003. Lecture Notes in Computer Science 3237 (pp. 646-652). Springer.*
Oard, D. 1997c. Speech-based information retrieval for digital libraries. Tech. Rep. CS-TR-3778. University of Maryland at College Park, College Park, MD.*
Bertoldi, N. and Federico, M: ITC-irst at CLEF 2003: Cross-Language Spoken Document Retrieval. In this volume.*
Lo et al., 2003 W.K. Lo, H. Meng and P.C. Ching, Cross-language spoken document retrieval using HMM-based retrieval model with multi-scale fusion, ACM Trans. Asian Language Inform. Process. 2 (1) (2003), pp. 1-26.*

Jonathan Foote, An overview of audio information retrieval, Multimedia Systems, v.7 n.1, p. 2-10, Jan. 1999.*
Jones, G.J.F and Federico, M. CLEF2002 Cross-Language Spoken Document Retrieval Pilot Track Report. This volume.*
Lin, W.C., Lin, M.S. and Chen, H.H.: Cross-Language Image Retrieval via Spoken Query. In: Proceedings of RIAO 2004: Coupling Approaches, Coupling Media and Coupling Languages for Information Retrieval. Le Centre de Hautes Etudes Internationales d'Informatique Documentaire—C.I.D. (2004) 524-536.*
Witbrock et al. "Using Words and Phonetic Strings for Efficient Information Retrieval from Imperfectly Transcribed Spoken Documents" 1997.*
Hansen et al. "SpeechFind: Advances in Spoken Document Retrieval for a National Gallery of the Spoken Word" 2005.*
Zhong et al. "A Context-Aware Language Model for Spoken Query Retrieval" 2005.*
Siohan et al. "Fast Vocabulary-Independent Audio Search Using Path-Based Graph Indexing" 2005.*
Kamel et al. "An Efficient Mechanism for Searching Arabic Audio Libraries" 2004.*
Schone et al. "Low-Resource Autodiacritization of Abjads for Speech Keyword Search" 2006.*
Olsson et al. "Fast Unconstrained Audio Search in Numerous Human Languages" Apr. 2007.*
Al-Onaizan et al. "Machine transliteration of names in Arabic text" 2002.*
Gauvain et al. "Structuring Broadcast Audio for Information Access" 2003.*
Olsson et al. "Combining Evidence for Improved Speech Retrieval" Apr. 2007.*
Peng Yu et al. "Fast Two-Stage Vocabulary-Independent Search in Spontaneous Speech," In Proceedings of the IEEE International Conference on Acoustics, Speech and Signal Processing (ICASSP), Philadelphia, PA, Mar. 18-23, 2005, vol. 1, pp. 481-484.
Beth Logan et al. "Word and Sub-word Indexing Approaches for Reducing the Effects of OOV Queries on Spoken Audio," Proceedings of the Second International Conference on Human Language Technology Research (HLT), San Diego, CA, 2002.

* cited by examiner

|   220          |   222        |  224  |  226    |  228    |
|----------------|--------------|-------|---------|---------|
| sw4936.wav.pat | _l _eh _l    | 0.71  | 163.18  | 163.39  |
| sw4936.wav.pat | _l _eh _l    | 0.57  | 282.56  | 282.77  |
| sw4936.wav.pat | _l _eh _l    | 0.50  | 171.27  | 171.48  |
| sw4936.wav.pat | _l _eh _r    | 0.76  | 171.27  | 171.48  |
| sw4936.wav.pat | _l _eh _k    | 0.75  | 113.34  | 113.55  |
| sw4936.wav.pat | _l _eh _k    | 0.71  | 171.63  | 171.84  |
| sw4936.wav.pat | _l _eh _k    | 0.59  | 285.24  | 285.45  |
| sw4936.wav.pat | _l _eh _k    | 0.57  | 91.37   | 91.58   |
| sw4936.wav.pat | _l _eh _k    | 0.55  | 56.12   | 56.33   |
| sw4936.wav.pat | _l _eh _sh   | 0.58  | 163.47  | 163.68  |
| sw4936.wav.pat | _l _eh _hh   | 0.73  | 171.27  | 171.48  |
| sw4936.wav.pat | _l _eh _hh   | 0.50  | 250.21  | 250.42  |
| sw4936.wav.pat | _l _l _pause_| 0.68  | 47.79   | 47.93   |
|                | . . .        |       |         |         |

| sw4936.wav.pat | _l _eh _l    | 0.71  | 163.18  | 163.39  |
|----------------|--------------|-------|---------|---------|
| sw4936.wav.pat | _l _eh _l    | 0.57  | 282.56  | 282.77  |
| sw4936.wav.pat | _l _eh _l    | 0.50  | 171.27  | 171.48  |
| sw4936.wav.pat | _l _eh _r    | 0.76  | 171.27  | 171.48  |
| sw4936.wav.pat | _l _eh _k    | 0.75  | 113.34  | 113.55  |
| sw4936.wav.pat | _l _eh _k    | 0.71  | 171.63  | 171.84  |
| sw4936.wav.pat | _l _eh _k    | 0.59  | 285.24  | 285.45  |
| sw4936.wav.pat | _l _eh _k    | 0.57  | 91.37   | 91.58   |
| sw4936.wav.pat | _l _eh _k    | 0.55  | 56.12   | 56.33   |
| sw4936.wav.pat | _l _eh _sh   | 0.58  | 163.47  | 163.68  |
| sw4936.wav.pat | _l _eh _hh   | 0.73  | 171.27  | 171.48  |
| sw4936.wav.pat | _l _eh _hh   | 0.50  | 250.21  | 250.42  |
| sw4936.wav.pat | _l _l _pause_| 0.68  | 47.79   | 47.93   |
|                | . . .        |       |         |         |
| sw4936.wav.pat | Hello        | 0.96  | 34.53   | 35.51   |
| sw4936.wav.pat | World        | 0.91  | 453.53  | 455.01  |
|                | . . .        |       |         |         |

KEYWORD SPOTTING USING A PHONEME-SEQUENCE INDEX

CROSS-REFERENCE TO RELATED APPLICATIONS

This application claims priority to U.S. Provisional Application No. 60/968,333, filed Aug. 28, 2007, titled "Keyword Spotting Using a Phoneme-Sequence Index," the contents of which are incorporated herein by reference in its entirety. This application is also related to U.S. patent application Ser. No. 10/565,570, filed Jul. 22, 2004, titled "Spoken Word Spotting Queries," published as U.S. Publication 2007/0033003 A1 on Feb. 8, 2007, and to U.S. patent application Ser. No. 09/799,385, filed Mar. 5, 2001, titled "Phonetic Searching," issued as U.S. Pat. No. 7,263,484 on Aug. 28, 2007, the contents of which are incorporated herein by reference in their entirety.

BACKGROUND

One conventional technique for performing fast keyword/phrase spotting on an audio corpus is to generate a lattice with the lattice entries consisting of phoneme subsequences and store lattice scores and time offsets in a database. At search time, a query is broken down according to which subsequences are included, and all entries for the relevant subsequences are pulled from the database.

SUMMARY

Systems, computer program products, processes, and methods for scalable keyword spotting using a phoneme-sequence index are disclosed.

In some aspects, a wordspotter is used to locate occurrences in an audio corpus of each of a set of predetermined subword units, which may be phoneme sequences. To locate a query (e.g., a keyword or phrase) in the audio corpus, constituent subword units in the query are indentified and then locations of those subwords are determined based on the locations of those subword units determined earlier by the wordspotter, for example, using a pre-built inverted index that maps subword units to their locations.

In some aspects, a method includes performing independent searches for sequences of subword units in one or more media files (e.g., audio files) to locate instances of the sequences of subword units in the media files. The method also includes generating a result index including the located instances of the sequences of subword units. The method also includes accepting query data and processing the query data including determining a representation of the query that defines multiple sequences of subword units each representing the query. The method also includes searching the result index to locate instances of the determined multiple sequences of subword units from the query.

Embodiments may include one or more of the following.

Performing the independent searches for sequences of subword units can include applying a speech recognition algorithm to the media files for each of the sequences of subword units. The subword units can include linguistic units. The subword units can include phoneme based sequences including two to eight phonemes. The subword units comprise three phoneme based sequences. Locating instances of the query in media files further can include generating a list of candidate locations based on the result index. The method can include processing portions of the one or more media files at the candidate locations. Processing the portions of the one or more media files can include applying a speech recognition algorithm to the media files for the query data.

In some aspects software stored on a computer-readable medium can include instructions for causing a processing system to perform independent searches for sequences of subword units in one or more media files to locate instances of the sequences of subword units in the media files. The software also includes instructions to generate a result index including the located instances of the sequences of subword units. The software also includes instructions to accepting query data and process the query data including determining a representation of the query that defines multiple sequences of subword units each representing the query. The software also includes instructions to search the result index to locating instances of the determined multiple sequences of subword units from the query.

Embodiments can include one or more of the following.

The instructions to perform the independent searches for the sequences of subword units can include instructions to apply a speech recognition algorithm to the media files for each of the sequences of subword units. The subword units can include linguistic units. The subword units can include phoneme based sequences including two to eight phonemes. The subword units can include three phoneme based sequences. The instructions to locate instances of the query in media files further can include instructions to generate a list of candidate locations based on the result index. The software can also include instructions to process portions of the one or more media files at the candidate locations. The instructions to process the portions of the one or more media files can include instructions to apply a speech recognition algorithm to the media files for the query data.

In some aspects, a method includes accepting query data and processing the query data to determine a representation of the query that includes multiple sequences of subword units each representing the query. The method also includes searching an index that includes locations of instances of a plurality of subword units to generate a list of candidate locations for the sequences of subword units included in the query. The method also includes applying a speech recognition algorithm to the candidate locations of media files for the query data.

Embodiments can include one or more of the following.

The method can also include generating the index that includes locations of instances of a plurality of subword units, wherein generating the index comprises performing independent searches for sequences of subword units in one or more media files to locate instances of the sequences of subword units in the media files.

In some aspects, software stored on a computer-readable medium can include instructions for causing a processing system to accept query data and process the query data to determine a representation of the query that includes multiple sequences of subword units each representing the query. The software can also include instructions to search an index that includes locations of instances of a plurality of subword units to generate a list of candidate locations for the sequences of subword units included in the query. The software can also include instructions to apply a speech recognition algorithm to the candidate locations of media files for the query data.

Embodiments can include one or more of the following.

The software can also include instructions to cause the processing system to generate the index that includes locations of instances of a plurality of subword units. The instructions for causing the processing system to generate the index can include instructions for causing the processing system to perform independent searches for sequences of subword units in one or more media files to locate instances of the sequences of subword units in the media files.

Embodiments can have a number of advantages, which can include one or more of the following.

A key-result index has different characteristics than a lattice generated as would be done for automatic speech recognition (ASR), which can be desirable for some applications. This can be true even if the lattice has been built using the same phoneme sequences as the key-result index, and then turned into an inverted index. For example, a lattice generated for ASR has implicit constraints on segment lengths, and interactions between segments, even if this lattice contains sub-word units. The index generated using the keyword spotting and keys as described herein uses hits as computed by an underlying wordspotter, which can ignore segment interactions and constraints. As such, due to the independent nature of the searching for the phoneme sequences in which a separate search is conducted for each phoneme sequent, the hits can be independent of the segment interactions and constraints.

Other features and advantages of the invention are apparent from the following description, and from the claims.

BRIEF DESCRIPTION OF THE DRAWINGS

FIG. 2A and FIG. 2B are examples of an index.

DESCRIPTION

Figure 1:
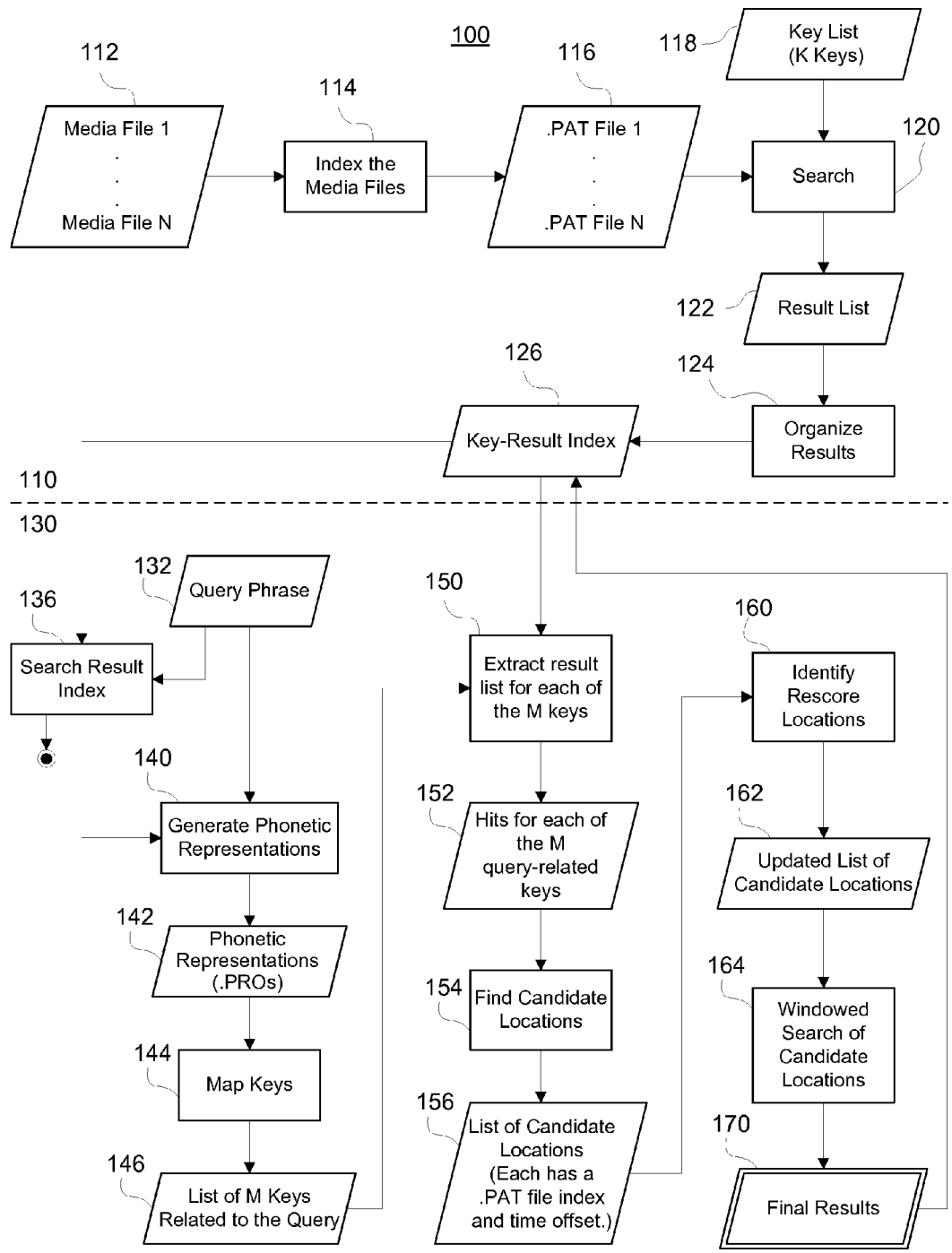
FIG. 1 is a flow of an indexed keyword spotting process.

This disclosure relates to a method for performing indexed keyword spotting. A fast keyword spotter is used to search for a set of phoneme sequences, which in general are constituents of words. An exemplary fast keyword spotter is described in greater detail in U.S. Patent Application "Spoken Word Spotting Queries," U.S. Publication 2007/0033003 A1, published Feb. 8, 2007, and in U.S. Pat. No. 7,263,484, titled "Phonetic Searching," issued on Aug. 28, 2007.

Typically, a large number of these phoneme sequences are used, and the complete set of them will from here be referred to as the keys. In general, the phoneme sequences can, for example, be any sequence of 2 or more phonemes (e.g., 2 phoneme sequences, 3 phoneme sequences, 4 phoneme sequences, 5 phoneme sequences, 6 phoneme sequences, 7 phoneme sequences, 8 phoneme sequences etc.) and can be selected to cover possible phoneme sequences that can exist in the language. For example, different phoneme sequences (either from a language specific or a language-independent phoneme set) might be used for English than for Chinese word spotting.

In an exemplary embodiment, the system uses phoneme sequences of three phonemes (i.e., a set of phoneme sequences each of length three). The set of 3-phoneme sequences that is used can include all possible 3-phoneme combinations. However, many of the 3-phoneme combinations do not occur in the English language or are infrequently used in the English language. Such phoneme sequences may be removed from the set of keys used by the system in order to reduce the computation time. For example, the 20,000-30,000 three-phoneme based sequences that occur most frequently in the English language (or another language) may be selected for inclusion in the set of keys used by the system.

Each key included in the keys set is independently run against a media file (e.g., an audio file) using the keyword spotter to generate a set of occurrences (referred to as hits) of the key (e.g., the phoneme sequence) in the media file. As such, each key will, after searching the media file, result in a list of hits indicating where each hit has a start time offset, and possibly indicating a score and an end time offset. These results for all keys are stored in a database and arranged by key ID, forming an inverted index, referred to in this description as a key-result index.

To run a search using the system, a query phrase is converted into a phonetic representation using a phonetic lexicon, spelling to sound rules, word boundary context constraints, and other phonetic context constraints. After forming the phonetic representation of the search, the system determines a set of keys that are contained in the query. Further, it is also possible to identify keys that are phonetically similar to subsequences of the query, for example the key "_b_ah_t" is similar enough to "_b_ah_d" that it could be used in place of, or in conjunction with, an exact query phrase subsequence. It is not necessary to have every possible subsequence represented in the key set, nor even to have every phoneme of the query appear in one of the keys. It is only necessary that at least one key be identified as being related to the phoneme sequence of the query. This leaves many possible methods for finding the set of keys related to a query phrase, which will from here be referred to as the query-related keys.

Once the set of query-related keys has been identified, only the information for these keys needs to be loaded from the key-result index. As there are many keys, but only a handful of query-related keys, this means only a small percentage of the key-result index is loaded for any given query. For example, in some embodiments there will be approximately 20,000-30,000 (e.g., 25,000) keys used to create the key-result index, but only five or ten keys in the query-related keyset. This is especially beneficial for systems where the key-index is larger than the available system memory, and must be stored on disk or other slower-access media. Retrieval of the keys is efficient, requiring only a few seeks, as they are all stored close to each other in the key-result database.

Once the results for all of the query-related keys have been pulled from the key-result index, a matching algorithm can be used to find candidate locations where the query phrase might have occurred. One potential algorithm for doing the matching is to use dynamic programming to identify locations where many of the query-related keys occurred in close time proximity and in chronological order. It is not necessary for all query-related keys to appear, or for them to be in chronological order. The final output of this stage is a set of candidate locations where the query phrase might have been spoken.

In some embodiments, it is useful to insert another stage at this point that takes the initial set of candidate locations and trims this list based on an optimization criterion. For example, rescoring .pat (phonetic audio track) files using the Nexidia wordspotting system can require that the entire .pat file be loaded. If these files are stored on a slow disk system (e.g., for extremely large data sets where there is not enough RAM to load all .pats at once), it may be beneficial to limit the number of files being accessed, as a slow disk system can make I/O throughput a significant barrier to search speed. For this example, then, the initial list of candidate locations would be reparsed to identify only a small set of files, and only candidate locations within these files would be passed on to the final rescoring stage.

The final step is to optionally rescore each of the candidate locations. For some queries, it is possible that this step could be skipped entirely, as the query itself may be exactly equal to one of the keys, or else similar enough to not require rescoring. Or, for other reasons such as computational time constraints, it may suffice to simply return results without rescoring.

FIG. 1 shows a flow chart of an indexed keyword spotting process 100. The process is divided into two portions 110 and 130 (portion 110 is represented above the dashed line and portion 130 is represented below the dashed line). Portion 110 shows exemplary actions used to generate a key-result index and portion 130 shows exemplary actions used to search for a query phrase using the key-result index.

The system receives media files 112 and indexes (114) the media files, generating .pat files 116 from the media files 112. The system performs a search (120) on the .pat files 116 based on a list of keys 118 provided to the search tool. A result list 122 is generated by the search (120) and a result organizer organizes (124) the results into a key-result index 126.

In order to use the key-result index 126 to generate a query result, the system 100 receives a query phrase 132 from a user and generates (140) a phonetic representation of the query phrase 142. A key mapper maps (144) the phonetic representation to a list of M key(s) 146 that are related to the query. The system extracts (150) results for each of the M key(s) from the key result index 126 generating a list of hits 152 for the M key(s) that are related to the query. The list of hits 152 is used to find candidate locations (154) and a list of candidate locations 156 is provided to a wordspotter that identifies and rescores each of the locations (160). The wordspotter provides an updated list of candidate locations 162 and a windowed search of the candidate locations is performed (164) to generate the results 170, which are presented to the user.

In some embodiments, successful searches are stored in an index. For example, successful search results are stored intermixed with the phonemes in the key-result index 126 to create a more general search-result index. A query phrase 132 (e.g., "Hello") is first searched (136) against the search-result index 126. If a match is found, the process is finished and a result is returned. If a match is not found, the process continues with generation of a phonetic representation of the query phrase (140) (e.g., hh_eh__1_ow . . . ). Results 170 of the windowed search of candidate locations (164) are then fed back into the search-result index 126. Subsequent searches for the same query phrase produce the same results directly from the index (136) without generation of a phonetic representation of the query phrase (140).

In some embodiments, three or more levels of units may be indexed, for example, phoneme sequences, words, multiword phrases, etc. For example, a query for a multiword phrase may if found result in augmenting the index with the phrase as a whole, the individual words in the query, and in some embodiments, multiword subsequences of the phrase.

FIG. 2A shows an example index (202) specifying file name (column 220), indexed sequence (column 222), score (column 224), start time (column 226), and end time (column 228). In some embodiments in which successful search results are stored intermixed with the key-result index, the example index (202) is dynamically modified to include additional entries representative of successful search results. FIG. 2B shows an example intermixed index (204) with additional entries for successful search results, e.g., "Hello" and "World".

In some embodiments, different languages can be used to generate the key-result index and to rescore the candidate locations. For example, the system can use two different languages if the language of the audio was not known a priori. In this case, using a first language to generate the key-result index and a second language for rescoring the candidate locations allows the system to generate the key-result index once using a pre-selected language and search the audio using the language of the audio. For example, the key result index could be generated using English and a given a query could be formulated in Farsi. Referring to FIG. 1, in order to process the Farsi query, the Key Mapper (144) includes information about the relation of the phonemes in the two languages (e.g., English phonemes to phonemes in Farsi). Based on the relation between the phonemes in the different languages, the key mapper (144) generates a set of query related keys in the first language (e.g., English) based on the query entered in the second language (e.g., Farsi). The system uses a search in the second language (e.g., Farsi) to rescore the candidate locations.

Figure 3:
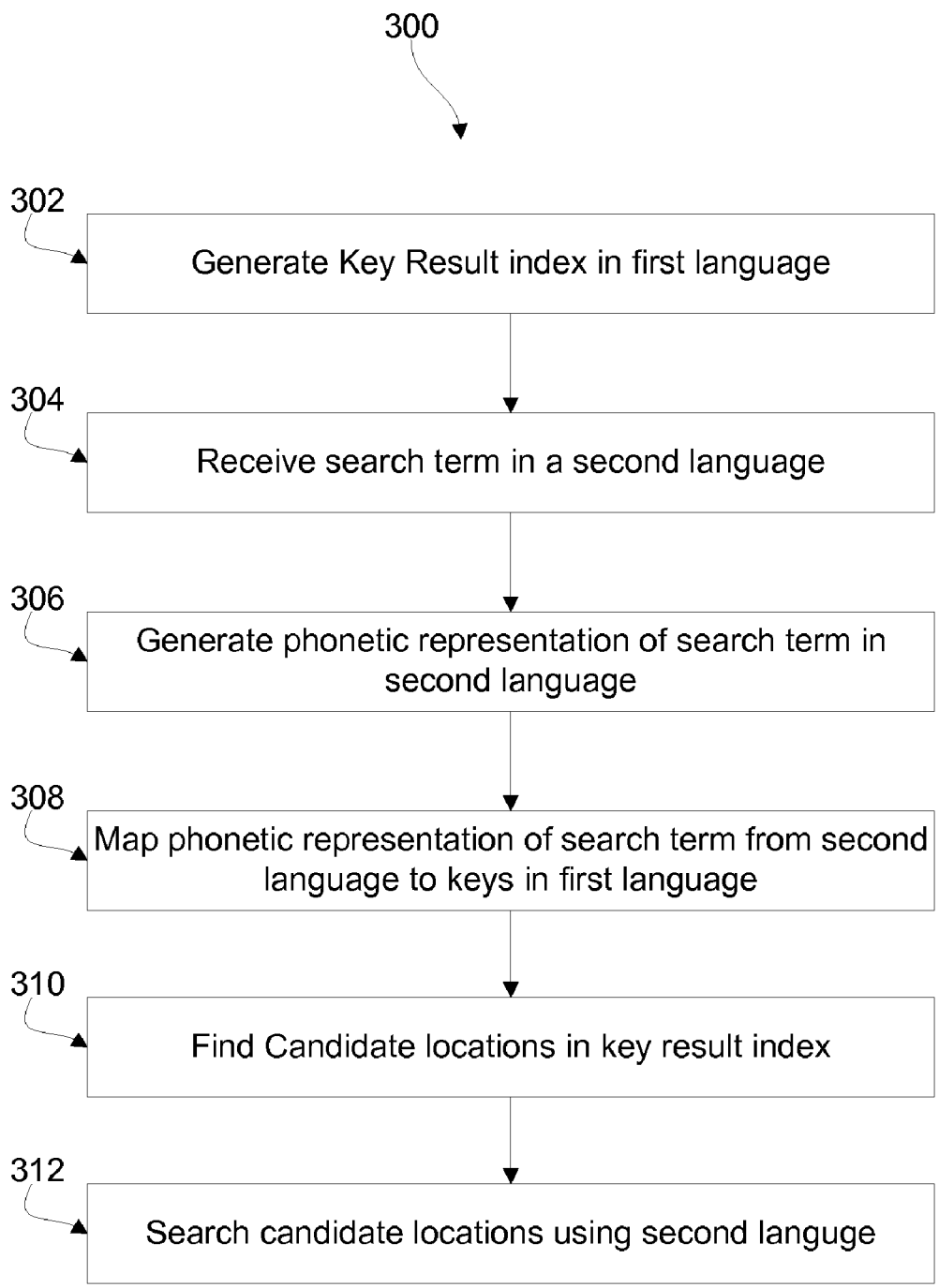
FIG. 3 is a flow chart of process for using different languages to generate a key-result index and to rescore candidate locations.

FIG. 3 shows a process 300 for using different languages to generate the key-result index and to rescore the candidate locations. The system generates a key result index in a first language (302) and receives a search term in a second language (304). The second language can be different from the first language. The system generates a phonetic representation of the search term in the second language (306) and maps the phonetic representation of the search term from the second language to the keys used to generate the key result index in the first language (308). The system finds candidate location in the key result index based on the mapped search term (310) and performs an additional search of the candidate locations using a wordspotting search using the second language (312).

Alternative systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method comprising:
accepting a query phrase of a first language;
processing the query phrase using a predefined set of phoneme sequences of a second language to generate a set of phoneme sequences that represent the query phrase;
searching an index that includes locations of instances of a plurality of the phoneme sequence of the generated set to generate a list of candidate locations of the query phrase in one or more media files associated with the index; and
applying a speech recognition algorithm to the one or more media files at the candidate locations of the list;
wherein a second language speech recognition algorithm is applied to the one or more media files at the candidate locations of the list.

2. The method of claim 1, further comprising:
generating the index based on results of searching a phonetic representation of the one or more media files to locate instances of phoneme sequences of the predefined set of phoneme sequences.

3. A non-transitory computer-readable medium encoded with software comprising instructions for causing a processing system to:
accept a query phrase of a first language;
process the query phrase using a predefined set of phoneme sequences of a second language to generate a set of phoneme sequences that represent the query phrase;
search an index that includes locations of instances of a plurality of the phoneme sequences of the generated set to generate a list of candidate locations of the query phrase in one or more media files associated with the index; and
apply a speech recognition algorithm to the one or more media files at the candidate locations of the list;
wherein a second language speech recognition algorithm is applied to the one or more media files at the candidate locations of the list.

4. The medium of claim 3, further comprising instructions for causing the processing system to generate the index based on results of searching a phonetic representation of the one or more media files to locate instances of phoneme sequences of the predefined set of phoneme sequences.

\* \* \* \* \*